July 24, 1951 — P. ERICSON — 2,562,025
SEPARATOR
Filed Dec. 22, 1945
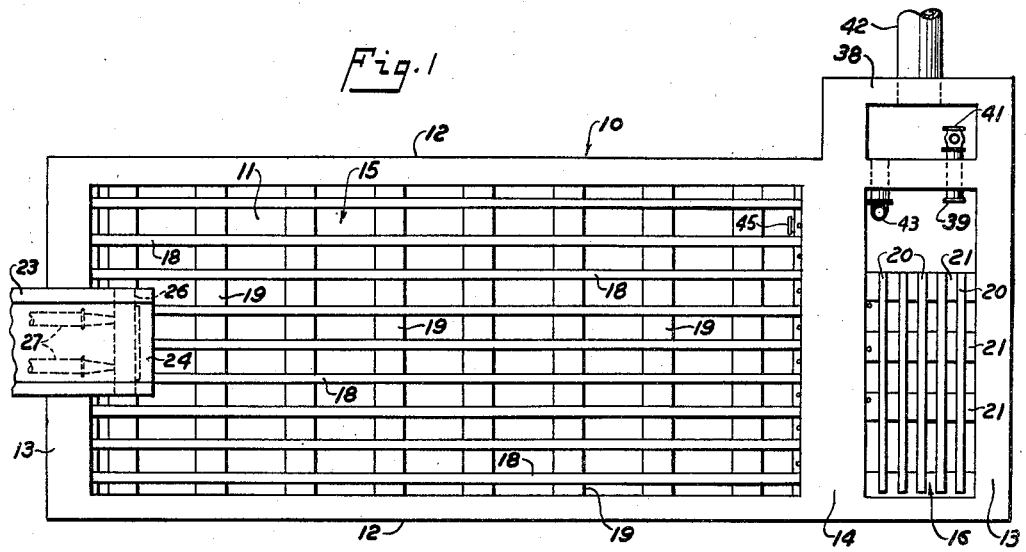
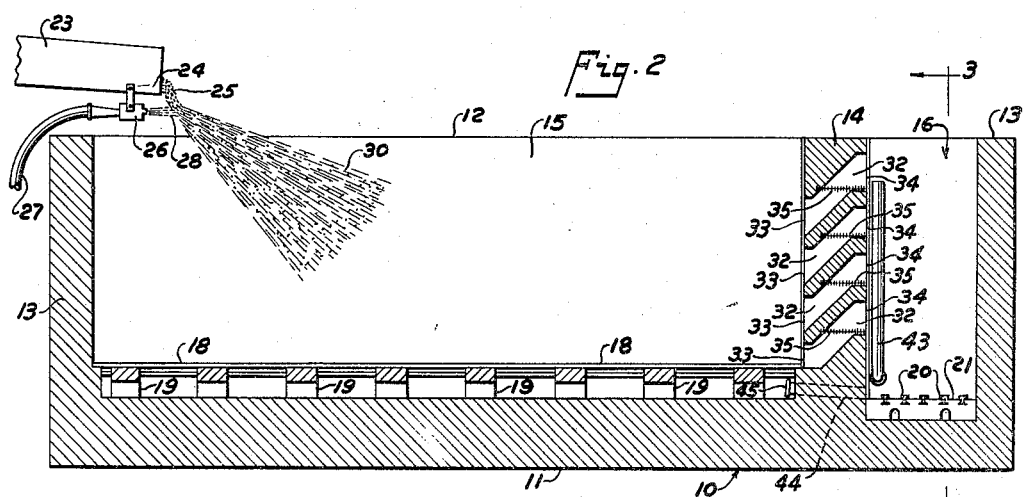
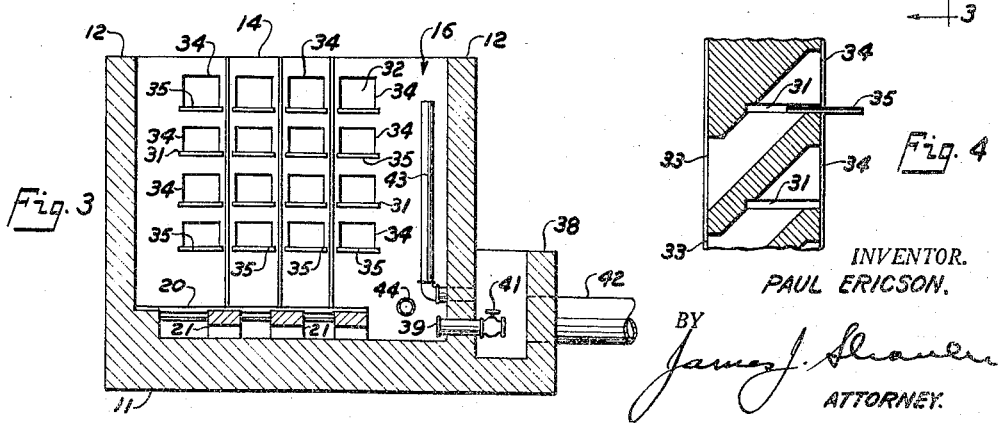
INVENTOR.
PAUL ERICSON.
BY
ATTORNEY.

Patented July 24, 1951

2,562,025

UNITED STATES PATENT OFFICE 2,562,025

SEPARATOR

Paul Ericson, Weirton, W. Va., assignor to National Steel Corporation, a corporation of Delaware Application December 22, 1945, Serial No. 636,834

7 Claims. (Cl. 210—45)

This invention relates to an apparatus for separating a mixture of particles and fluid and is primarily concerned with separating solid particles of slag from a mixture of these particles and water in such a manner as to expedite separate disposal of the slag and water.

Slag disposal is an important problem around blast furnaces and steel mills. The slag discharged from a blast furnace, open hearth furnace, or other type of furnace, is in a molten condition and at a highly elevated temperature. If this molten slag is allowed to cool and solidify without being agitated in some manner, it forms a large solid body which is very difficult and expensive to break up sufficiently so that it can be handled for disposal. A stream of cooling water may be directed against the stream of molten slag as it flows from the furnace to a suitable slag pit or tank and the water will rapidly cool the slag and break it up into small particles, some of which will be expanded sufficiently by the generated steam so that it will float. An acid slag tends to produce a relatively larger amount of floating slag and a basic slag tends to form a relatively smaller amount of floating slag, although either slag produces particles heavier than water and lighter than water. The slag particles and water must be separated before disposal as the slag particles cannot be permitted to flow out of the tank with the water to the sewer as they will clog the sewer. Attempts have been made to separate the slag particles from the mixture by placing screens across the drain passages but they readily become clogged and stop draining of the water from the tank. Further, the slag particles tend to become packed so solidly on the screens that it is very difficult to clean the screens. The large quantities of both floating and non-floating slag which must be separated have caused unusual and difficult to solve disposal problems.

Accordingly, it is an object of this invention to provide an improved apparatus for separating particles from a mixture of such particles and a fluid that will not become clogged and which can be easily cleaned.

It is a further object of this invention to provide an improved apparatus which is especially suitable for separating slag particles and water, and which can be operated with a minimum amount of attention and maintenance.

Another object of the present invention is to provide means for separating relatively large quantities of slag and water that permits rapid and easy disposal of the slag and water and that requires a relatively small amount of space.

The present apparatus will be more particularly described in connection with the separation and disposal of a mixture of slag particles and water and comprises a receiving tank containing a sieve wall including one or more drain passages. Each of the drain passages terminates in an inlet opening and an outlet opening and is inclined upwardly through the wall so that the water flows upwardly through the drain passage when flowing from the tank. A removable screen is provided in each passage that prevents the slag particles from flowing through the passage along with the water. The passage and screen are so constructed and arranged that they are substantially self-cleaning, and the outlet opening is preferably above the inlet opening so that none of the floating slag particles can enter the passage while water is flowing therethrough. This prevents the collection of floating slag particles on the screen that normally tend to move with the current and normally clog a screen placed across a drain passage in a conventional manner.

These and other objects and advantages will become more apparent from the following detailed description and accompanying drawings in which:

Figure 1 is a plan view of an apparatus embodying the features of the present invention;

Figure 2 is a longitudinal sectional view of the apparatus of Figure 1;

Figure 3 is a cross section taken along line 3—3 of Figure 2; and

Figure 4 is an enlarged view of a portion of Figure 2 showing the screen support.

Referring to the drawings, the slag and water separating tank 10 includes a bottom wall 11, side walls 12, and outer end walls 13. A sieve or screen-containing wall 14 extends across the tank between the side walls 12 and divides the tank into a slag receiving pit 15 and a drain pit 16. The upper surface of bottom wall 11 in pit 15 is protected against damage by a plurality of guard rails 18 supported on bridging members 19. Similarly, the upper surface of the bottom of drain pit 16 is protected by guard rails 20 mounted on supports 21.

The molten slag from the furnace or other source (not shown) flows along the slag chute 23 and over the lip 24 of chute 23 in a relatively slow moving stream 25. Beneath the end of chute 23 is a nozzle head 26 connected through hoses 27 to a suitable source (not shown) of cooling water under pressure. The nozzle head 26 is so positioned as to direct a stream of cooling water 28 against the stream of slag 25. Some of the water is converted to steam by the heat of the slag. The force of the relatively high-velocity water stream 28 and the generated steam break up the molten slag into relatively small particles and the stream of water and slag particles, schematically indicated at 30, falls into slag pit 15. Some of the slag particles are relatively porous and light as a result of expansion by the steam formed when the water strikes the hot slag. These porous slag particles tend to float on the water in pit 15 while the remaining slag particles, which are relatively dense, sink to the bottom of pit 15. Thus, the pit 15 contains water, relatively heavy slag particles at the bottom of the pit and relatively light slag particles floating on the top of the water.

The sieve wall 14 is constructed and arranged to rapidly drain away the water and separate and leave both the light and heavy slag particles in pit 15. The wall includes a plurality of rectangular drain passages 32 arranged in horizontal banks as shown more clearly in Figures 2 and 3. Each passage 32 terminates in an inlet opening 33 and an outlet opening 34. Water in pit 15 flows into passage 32 through inlet opening 33 and out through opening 34 into the drain pit 16 from which it flows to the sewer or other disposal means. Each passage 32 is inclined upwardly from the inlet opening to the outlet opening and the outlet opening 34 is preferably above and the inlet opening below a horizontal reference plane for the reasons to be more fully hereinafter described. As shown more clearly in the enlarged fragmentary views of Figure 4, a screen 35 extends horizontally across each passage 32 to separate and prevent the slag particles from flowing out of pit 15 along with the water. Each screen comprises a wire net 36 carried by a frame 37 of wood or other material and is horizontally slidably received by the horizontal bottom portion of the outlet opening 34 and is horizontally slidably supported in a pair of horizontal slots 31 presenting coplanar shoulders in the side walls of the passage 32. The screens 35 can be readily removed for repair or other purposes and replaced.

The water drained from pit 16 may be disposed of in any suitable manner by means of any suitable apparatus. In the embodiment shown in the drawings, a walled sump 38 is provided on the outside of tank 10. A drainpipe 39 extends through wall 12 between drain pit 16 and sump 38 and is provided with a flow control valve 41. The function of this valve 41 will be more fully hereinafter described when describing the operation of the apparatus. The water in sump 38 flows through a pipe 42 to the sewer.

An overflow pipe 43 is provided for pit 16 as a safety feature. Pipes 43 and 39 are of such size that together they can drain away the largest flow of water into pit 16. In the event pit 16 becomes filled with small slag particles, the pit may be cleaned by means of a grab-bucket, scoop or any other suitable apparatus. A drainpipe 44 having a cover screen 45 is provided in the bottom of wall 14 for draining any residual quantity of water from pit 15 when desirable. The drainpipe 44 is not large enough to take care of more than a small fraction of the water flow into pit 15.

Normally, the slag and water are intermittently discharged into the pit 15 while the slag is being tapped from the furnace. Pits 15 and 16 are normally at least about a quarter full of water before the slag starts to flow and valve 41 is in the closed position. This body of water aids in further cooling the slag. After the stream of slag and water 30 starts to flow into the pit 15, valve 41 is opened and the water starts to drain from pit 15 through the lower banks of passages 32 into pit 16 and through pipe 39 to the sewer. As the depth of the body of liquid in pit 15 rises, water starts to flow through the next higher bank of passages. This variation in depth of the water level in pit 15 is a result of the gradual filling-up of the pit by the slag although the rate of flow into the pit may momentarily be so great as to cause a rise in the water level.

The outlet opening 34 is placed above the inlet opening 33 so that the floating slag particles cannot be pulled into passage 32 and packed against the screen 35 by the current. As the level of heavy slag particles in the bottom of the tank rises, the lower banks of passages 32 may become gradually filled with the heavy slag particles which impede the flow of water so that the upper bank or banks of passages 32 will have the larger rate of flow. The large number of passages 32 provide a relatively large drain area and the velocity of flow is low which reduces packing of the heavy particles in the passages. With the outlet opening 34 above inlet opening 33, the only floating particles trapped by screen 35 are the small amounts of particles floating on the body of water in passage 32 prior to the time the water level rises to the top of inlet 33 and before there is any current through passage 32.

When the molten slag has stopped running, the water is turned off and the slag removed from the pit by a grab-bucket, scoop or other means. Slag can be moved from the pit while the stream 30 is flowing, though this is not the usual procedure. As the level of the slag particles is lowered, the slag particles in the passages 32 readily fall away from the lower surface of the screen 35 and fall down the inclined bottom surface of the passage into the pit. With this construction and arrangement, the passages 32 are self-cleaning, but, if desirable, a stream of water from a hose or other source can be directed through the outlet opening 34 to flush off the screen and wash out the passage.

The present apparatus provides a means for separating slag particles from a mixture of slag particles and water that functions in a highly desirable manner and requires only minimum of labor. The drain passages do not become clogged by floating slag particles and the drain passages are substantially self-cleaning.

I claim:

1. Apparatus for separating a mixture of floatable and sinkable solid particles from a body of liquid of varying depth comprising receptacle means including a bottom wall and an upwardly extending sieve wall structure, a plurality of drain passages for the liquid extending through the wall structure and terminating in inlet and outlet openings, the inlet openings being disposed at different heights in the wall structure, an inclined bottom wall in each passage extending upwardly from the inlet opening to the outlet opening, and a screen extending across each passage and overhanging the inclined bottom wall of the same whereby the particles stopped by the screen on flow of liquid through the passage can fall away from the screen to the bottom wall of the passage under the influence of gravity.

2. Apparatus according to claim 1 in which the outlet opening of each passage is located above and the corresponding inlet opening is located below a horizontal reference plane intersecting the passage.

3. Apparatus according to claim 1 in which the screens are disposed substantially horizontally.

4. Apparatus according to claim 3 in which each outlet opening has a straight horizontally disposed bottom portion, coplanar shoulders are associated with the walls of each passage adjacent the outlet opening, and the corresponding screens are slidably received by the bottom portion and supported by the shoulders.

5. Apparatus for separating a mixture of solid particles and liquid comprising a receptacle including a bottom wall, side and end walls, a separator wall extending across the receptacle from side wall to side wall intermediate the end walls to form a receiving pit for receiving the mixture of solid particles and liquid and a drain pit, a plurality of passages extending through the separator wall, each passage terminating in inlet and outlet openings, the inlet openings being disposed at different heights in the wall structure and the outlet opening of each passage being located above and the corresponding inlet opening being located below a horizontal reference plane intersecting the passage, an inclined bottom wall in each passage extending upwardly from the inlet opening to the outlet opening, the inlet openings communicating with the receiving pit and the outlet openings communicating with the drain pit, and a screen extending across each passage and overhanging the inclined bottom wall of the passage whereby the particles stopped by the screen on flow of liquid through the passage can fall away from the screen to the bottom of the passage under the influence of gravity.

6. Apparatus according to claim 5 in which the screen in each passage is disposed substantially horizontally.

7. Apparatus according to claim 6 in which each outlet opening has a straight horizontally disposed bottom portion, coplanar shoulders are associated with the side walls of each passage adjacent the outlet opening and the corresponding screens are slidably received by the bottom portion and supported by the shoulders.

PAUL ERICSON.

REFERENCES CITED

The following references are of record in the file of this patent:

UNITED STATES PATENTS

| Number | Name | Date |
|---|---|---|
| 397,585 | Coplen | Feb. 12, 1889 |
| 634,933 | Mueller | Oct. 17, 1899 |
| 744,193 | Hammond | Nov. 17, 1903 |
| 849,752 | Sewell | Apr. 9, 1907 |
| 866,626 | Cook | Sept. 24, 1907 |
| 952,620 | Keyes | Mar. 22, 1910 |
| 1,165,741 | Amos | Dec. 28, 1915 |
| 1,166,802 | Albert et al. | Jan. 4, 1916 |
| 1,336,553 | Darrow | Apr. 13, 1920 |
| 1,757,187 | Griffith | May 6, 1930 |
| 2,248,665 | Fisher | July 8, 1941 |
| 2,364,472 | Piatt | Dec. 5, 1944 |
| 2,414,176 | Smith et al. | Jan. 14, 1947 |

FOREIGN PATENTS

| Number | Country | Date |
|---|---|---|
| 582,953 | Germany | Aug. 25, 1933 |